UNITED STATES PATENT OFFICE.

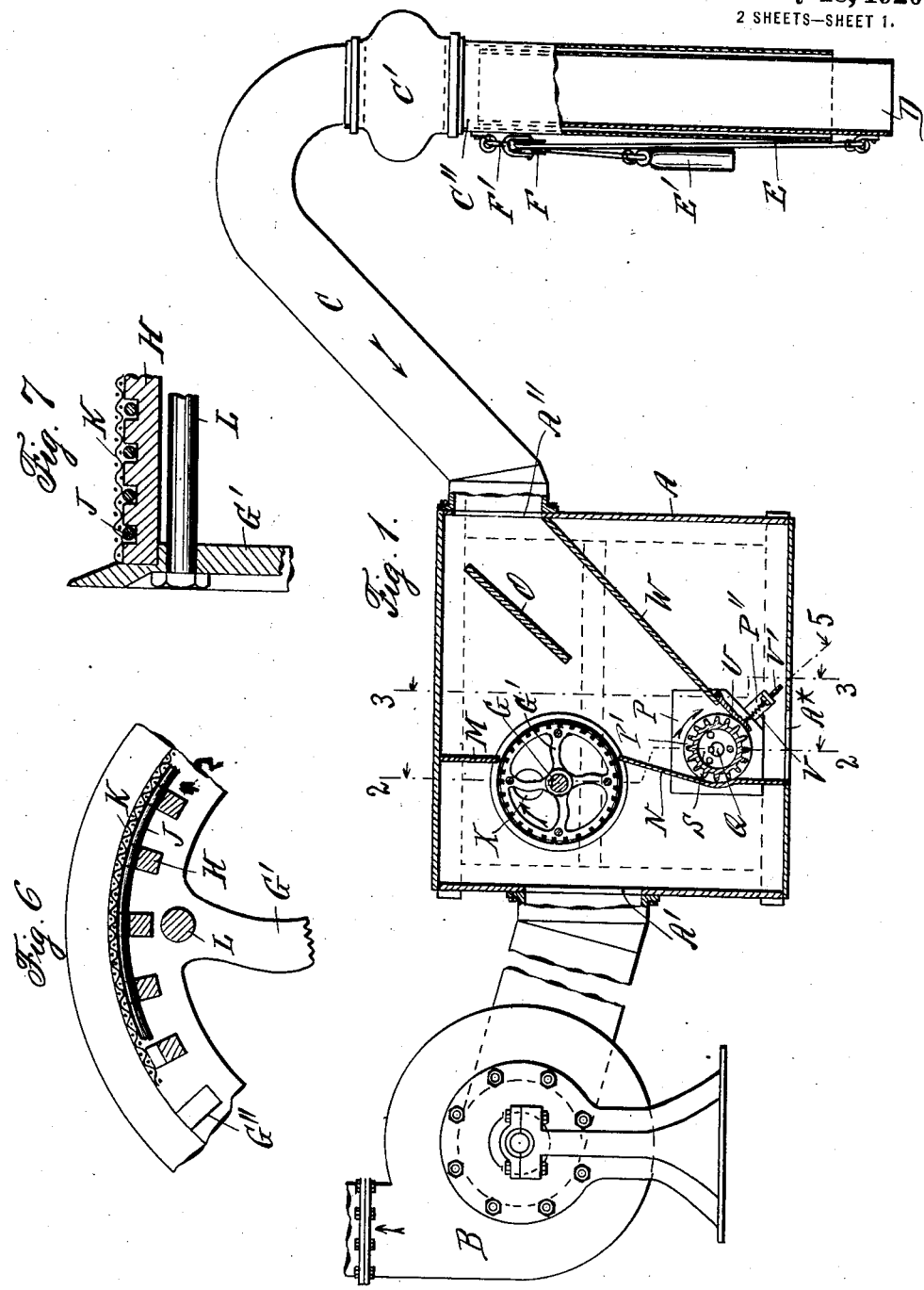
C. H. GOLLOHER.
DISCHARGE DEVICE FOR COTTON SEED UNLOADERS.
APPLICATION FILED OCT. 7, 1915.
1,340,164. Patented May 18, 1920.
2 SHEETS—SHEET 1.
WITNESS:
Charles A. Mathé.
INVENTOR
Charles H. Golloher
BY John Lotka
ATTORNEY

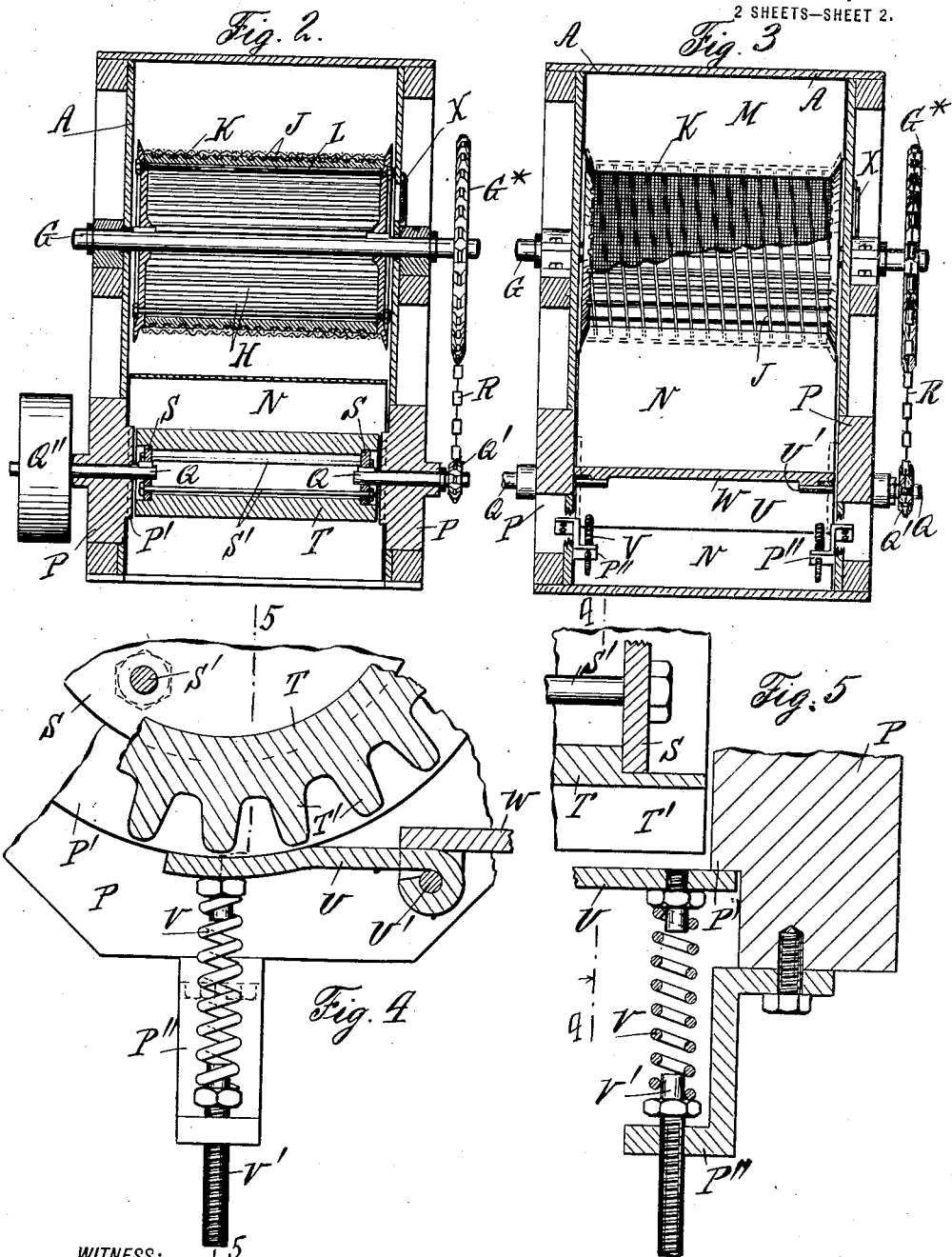

CHARLES H. GOLLOHER, OF BELLVILLE, TEXAS.

DISCHARGE DEVICE FOR COTTON-SEED UNLOADERS.

1,340,164.        Specification of Letters Patent.        Patented May 18, 1920.

Application filed October 7, 1915. Serial No. 54,492.

*To all whom it may concern:*

Be it known that I, CHARLES H. GOLLOHER, a citizen of the United States, and a resident of Bellville, in the county of Austin and State of Texas, have invented certain new and useful Improvements in Discharge Devices for Cotton-Seed Unloaders, of which the following is a specification.

My invention relates to a discharge device for apparatus by means of which cotton seed may be unloaded from a wagon to an elevator, conveyer, or any other place desired, and has for its object to clean and cool the cotton seed while it is being unloaded, and also to dry it at the same time, thus putting the cotton seed in a better condition for storing: For this purpose, I employ an apparatus in which a current of air conveys the cotton seed and at the same time dries and cleans it, the dry seed being discharged through an improved device for this purpose as will be fully described hereinafter, the novel features of my invention being pointed out in the appended claims.

Reference is to be had to the accompanying drawings, in which Figure 1 is a side elevation of one form of cotton seed unloader provided with an improved discharge device, with parts in section; Figs. 2 and 3 are vertical sections on lines 2—2 and 3—3 respectively of Fig. 1; Fig. 4 is a detail vertical section on line 4—4 of Fig. 5; Fig. 5 is a detail section in the inclined plane indicated at 5 in Fig. 1 and at 5—5 in Fig. 4; Fig. 6 is a partial vertical section perpendicular to the axis of a drum forming part of my device; and Fig. 7 is a partial longitudinal section of such drum.

A is a box, constructed substantially airtight of boards or otherwise, and provided at one end with an opening A' for connection to a suction device, such as the blower B. At the other end is an opening A'' by which said box communicates with a pipe C, preferably rigidly secured to the box, a flexible pipe portion C' (say, of leather) being applied at the other, receiving end of the pipe C, to connect it with an intake pipe C''. Preferably, the latter is made with a telescopic extension D, which can be projected more or less as desired, and is connected by a wire or other flexible connection E, passing over a pulley F journaled in a frame F' on the intake pipe C'', with a weight E' serving to balance said extension D. Within the upper portion of the box A is journaled a horizontal shaft G held to rotate with drum heads G' which are provided on their opposing faces, with seats or sockets G'' (see Fig. 6) to receive the ends of bars H parallel with the said shaft G. The bars H are notched as shown to receive a helically wound stiff wire J, which serves as a support for a wire netting or like cover K forming the outer wall of the drum. Bolts L, with nuts at the ends, connect the two heads G' and press them against the ends of the bars H. Of course, the heads are spaced sufficiently from the side walls of the box A to prevent them from rubbing against the said walls as the drum rotates. From the top of the box A a partition M extends downwardly to a point close to the periphery of the drum, but without touching the drum. Similarly, a partition N extends upwardly from the bottom of the box A to a line close to the drum, but without coming into actual contact therewith. Between the opening A'' and the drum, an inclined deflector O is secured within the box, extending fully across said box but having its upper edge terminating at a distance from the top wall of the box A, so that the stream of air coming from the pipe C can divide and pass partly over and partly under the said deflector, in order to reach the perforated drum. The separation of the cotton seed from the air is greatly facilitated by this upward diversion of a portion of the air current.

In the lower portion of the box A, and adjacent to an opening A* provided in the bottom of the box, is located a discharge roll arranged to rotate about a horizontal axis parallel to the shaft G. For this purpose, bearings P set in the side walls of the box A, receive two alining stub shafts Q, on which are secured rigidly heads S connected by bolts S', with nuts at the ends. These bolts also press the heads S against the shell or body T of the discharge roll, provided with longitudinal teeth T'. On one of the stub shafts Q is secured a sprocket Q', connected by a chain R with the sprocket G* on the shaft G, while the other shaft Q carries a pulley Q″ for the reception of a driving belt (not shown). The bearings P are provided with inwardly-projecting hubs or bosses P′ of a diameter slightly larger than the discharge roll, measured to the outer ends of the teeth T′, as shown in Fig. 4, and against these hubs is adapted to rest a gate U hinged at U′ to a stationary inclined board W arranged within the box A and extending fully across the same. The projecting hubs P′ thus prevent the gate U from being pressed against the teeth T′ and rubbing against them. The gate U is pressed against the hubs P′ by springs V whose lower ends engage bolts V′ screwed into stationary brackets P″, the tension of said springs being adjusted by screwing said bolts in or out. Immediately beneath the discharge roll, the box or casing A is provided with the above mentioned opening or outlet A*. In one of its side walls, at a point through which access may be had to the interior of the perforated drum, the casing A is provided with a movable or removable door X, which, as shown, may contain a transparent pane so that the interior of the drum may be inspected even when the door is closed. The heads G′ are made in the form of spiders (see Fig. 1) thus affording clearances through which the interior of the drum is accessible when the door X is opened.

In operation, the blower B being started, and the extension D brought in contact with the load of cotton seed on a wagon or the like, such seed (which has previously been freed from the long lint in the usual way) is raised by suction into the pipes D, C′, C and is thus drawn into the box or casing A, the air continuing through said casing and through the perforated rotating drum to the opening A′ and the blower B. The seeds (with short lint adhering thereto) which enter the casing A with the air current at A″ cannot travel in a direct line to the perforated drum, but are deflected downwardly by the deflector O, so that all the seeds, or the large majority of them, are thrown down on the incline W and slide toward the discharge roll T, T′, the rotation of which forces such seeds out through the space between the teeth T′ and the gate U, which latter yields against the tension of the springs V. The teeth T′ do not touch either the curved portion of the gate U, or the corresponding portion of the partition N, both of which curved portions are in engagement with the hubs P′, the latter, as stated above, extending beyond the outer ends of the teeth T′. Through the opening A*, the seeds are discharged, say, upon a conveyer, elevator, or other device which brings them to the place where the seeds are stored. The air current removes the moisture from the seeds, so that they leave the outlet A* in a dry condition, and the detrimental and dangerous heating of the stored seeds by the action of the moisture adhering to them, is avoided. The air current also cools the seeds so that they are delivered to the place of storage in a cool and dry condition. Furthermore, dust and small particles of dirt adhering to, or mixed with, the seeds, are separated therefrom by the air current and carried upwardly against and partly into and through the rotating perforated drum; this drum will also catch any lint that may become detached, and will arrest, and cause to be thrown down to the discharge roll, any seeds which may be drawn against the drum, notwithstanding the action of the deflector O. Any matter which may be held against the outer surface of the perforated drum, is removed therefrom, as the drum rotates, by the upper edge of the partition N, which edge acts as a scraper. The rotation of the drum also constantly brings fresh peripheral portions thereof forward of the partitions M, N, so as to minimize the danger of clogging the periphery of said drum. Any dirt or other material that may pass into the drum, may be removed from time to time through the door X, and when said door is transparent, as I prefer to make it, the condition of the drum surface may be ascertained readily at any time without opening or removing the door.

It may be said that the partitions M, N, with the portion of the drum periphery in advance of them, divide the casing A into a forward compartment containing also the deflector O and the discharge roll, together with the incline W leading from the inlet A″ to the discharge roll and to the gate U, and a rear compartment containing the outlet A′ and the other (major) portion of the perforated drum.

Various modifications may be made without departing from the nature of my invention as set forth in the appended claims.

I claim as my invention:

1. In a device of the class described, a casing having an inlet and an outlet for the material to be conveyed, a rotary discharge roll at said outlet, a pressure gate located adjacent to said roll and urged toward the same, and stationary stop means for preventing the gate from coming in contact with said rotary discharge roll.

2. In a device of the class described, a casing having an inlet for air and for the material to be conveyed, an outlet for said material, a rotary discharge roll at said outlet, a pressure gate adjacent to said discharge roll, and stationary bosses projecting beyond the periphery of the roll toward said gate to prevent the latter from coming in contact with the roll.

3. In a device of the class described, a casing having an inlet for air and for the material to be conveyed, an outlet for said material, a guiding partition at one side of said outlet, a pressure gate at the other side of said outlet, a rotary discharge roll located at said outlet between said partition and said gate, and bearings for the ends of said roll, said bearings having stationary bosses extending beyond the periphery of the roll and engaged by said partition and by said gate to hold them out of contact with the discharge roll.

In testimony whereof, I have signed this specification.

CHARLES H. GOLLOHER.